(12) United States Patent
Saxton

(10) Patent No.: US 7,345,785 B2
(45) Date of Patent: Mar. 18, 2008

(54) METHOD OF COMPENSATING FOR SCAN CONVERSION RULES AND IMPOSITION SHIFTS

(75) Inventor: Timothy H. Saxton, Surrey (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 934 days.

(21) Appl. No.: 10/247,604

(22) Filed: Sep. 18, 2002

(65) Prior Publication Data
US 2004/0052423 A1    Mar. 18, 2004

(51) Int. Cl.
H04N 1/40    (2006.01)

(52) U.S. Cl. ................. 358/1.9; 358/1.18

(58) Field of Classification Search ........... 358/1.9, 358/1.1, 3.2, 2.1, 1.15–1.18
See application file for complete search history.

(56) References Cited

U.S. PATENT DOCUMENTS

| | | | |
|---|---|---|---|
| 5,604,843 A | 2/1997 | Shaw et al. | |
| 5,784,049 A | 7/1998 | Hall | |
| 5,808,622 A | 9/1998 | Hall | |
| 6,055,064 A | 4/2000 | Lifshitz et al. | |
| 6,179,485 B1 | 1/2001 | Harrington | |
| 6,259,821 B1 | 7/2001 | Branciforte et al. | |
| 6,289,364 B1 | 9/2001 | Borg et al. | |
| 6,295,134 B1 | 9/2001 | Hughes | |
| 6,324,309 B1 | 11/2001 | Tokuyama et al. | |
| 6,359,695 B1 * | 3/2002 | Takahashi et al. | 358/1.1 |

* cited by examiner

Primary Examiner—Thomas D. Lee
Assistant Examiner—Stephen Brinich
(74) Attorney, Agent, or Firm—Donna P. Suchy

(57) ABSTRACT

The present invention provides a system and method for digital image compensation wherein the image is divided into tiles, at least one of the tiles employing a rectfill. Compensation is provided by reducing the size of the rectfill at the edges by half a pixel all around. As a result, any minor overlaps of adjacent pixels are eliminated, resulting in only the correct pixels being filled.

6 Claims, 6 Drawing Sheets

METHOD OF COMPENSATING FOR SCAN CONVERSION RULES AND IMPOSITION SHIFTS

FIELD OF THE INVENTION

The present invention relates generally to image compensation techniques for digitized images and, more particularly, to an image compensation technique for rectangular-filled portions of an image.

BACKGROUND OF THE INVENTION

Digital imaging systems have improved the process of creating, editing and rendering images. In particular, digital imaging systems have decreased the amount of processing time necessary to render an image. Nonetheless, the ability of digital imaging systems to process and, particularly, to render images remains limited by the memory capacity of digital imaging systems.

In digital imaging systems, an image is often divided into a rectangular grid defined by fixed spatial coordinates. Each grid element defines a sample point having one color. Each sample point is referred to as a picture element, commonly known as a pixel or a "dot" (not to be confused with the halftone dot used in the printing industry). Such an image is usually referred to as a raster image and is typically represented and stored in a format that uses several bits per pixel to identify the color of each pixel. The total amount of data necessary to represent an image depends on several factors, some of which include the image size, the resolution of the image, and the number of bits per pixel.

Large high-resolution images, particularly those containing "continuous tone," "contone" or "CT" content (multiple bits per color component per pixel), require an extensive amount of data to represent the images. Because image rendering devices have limited memory and processing capacity, large high-resolution images often place a demand on image rendering devices that exceeds the image rendering capabilities of the devices. As an example, a typical Raster Image Processor ("RIP") would not be able to handle the volume of printing format data in a 1200 dot per inch ("dpi") image file represented in contone raster format. Such a file might contain the imaging data required for a map. For example, a file for printing a 32 inch by 44 inch sized image formed of 1200 dpi, 8 bits-per-pixel elements would require about 2 gigabytes of memory, well beyond that available to most rendering/RIP workstations. In many practical applications, such images consist of some photographic content and a large portion of "line work" ("LW") data, i.e., text or geometric objects that delineate areas of constant color that are easily compressible, i.e., amendable to representation with a small number of bits per pixel.

One method of reducing the data volume of high resolution images is to divide the image into tiles, which can be handled more easily than full images. Rectangular portions of the tiles can then be "filled," allowing the same information that was in a related portion of a raster image to be represented by a much smaller volume of data. An example of such a filling method is described in a U.S. Pat. No. 7,075,681 issued Jul. 11, 2006, titled SYSTEM AND METHOD FOR REDUCING THE DATA VOLUME OF IMAGES, the subject matter of which is hereby incorporated by reference. As described in this application, the "filled" rectangular portions are referred to as "rectfills." More specifically, a rectfill is a rectangular area of an image filled with a single color. Filling is accomplished by defining the coordinates of the area and designating a single color with which to fill the area. The coordinates can define rectangular area as small as a single pixel or a rectangular area covering a large number of pixels. The single color can be defined in terms of CMYK or RBG values or a spot value and a possible transparency value. A further explanation at color values and rectfills is described in U.S. Publication No. 2004-0051884 published Mar. 18, 2004, titled METHOD OF ENCODING RASTER DATA BASED ON VARIATIONS OF COLOR, the subject matter which is hereby incorporated by reference. The drawback with employing rectfills to reduce data volume is that if the coordinates used to define the rectfill do not exactly coincide with pixel locations during rendering (perhaps due to the use of real numbers, the application of the output device rules or due to resizing an image, etc.), the wrong pixels may be filled by the rectfill color, resulting in gaps between rendered pixels or over-writing of other pixels as rendering "artifacts."

Accordingly, there is a need for methods and apparatus for accurately rendering images that have been rectfill converted to have a reduced data volume. In particular, there is a need for methods and apparatus for accurately rendering rectfill reduced data volume images.

SUMMARY OF THE INVENTION

The present invention provides a system and method for eliminating rectfill coordinate errors in digitized images employing rectfills by reducing the size of and repositioning rectfills. The invention is preferably used with tiled images and can be employed when a tiled image is created for storage, or when a tiled image is shifted. In accordance with others aspects of the invention, the size of the rectfill is reduced at the edges by a predetermined amount, preferably half a pixel, all around (or in some instances slightly more or less than half a pixel). As a result, any minor overlaps with other pixels is eliminated.

In accordance with other aspects of this invention, instead of reducing the rectfill by a predetermined amount, i.e., half a pixel on all sides, only one vertical side and one horizontal side are reduced. Then the reduced pixel is recentered, shifting the rectfill to compensate for the size reduction. In this case, the preferred horizontal and vertical size reduction is by one pixel.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF PREFERRED EMBODIMENTS

In the following detailed description of exemplary embodiments of the invention, reference is made to the accompanying drawings which form a part hereof and which illustrate specific exemplary embodiments of the invention. These embodiments are described in sufficient detail to enable those skilled in the art to practice the invention. It is to be understood that other embodiments fall within the scope of the invention and that changes may be made without departing from the scope of the invention. The following detailed description, therefore, should be taken as exemplary, not limiting, and that the scope of the present invention is defined only by the appended claims.

Figure 1:
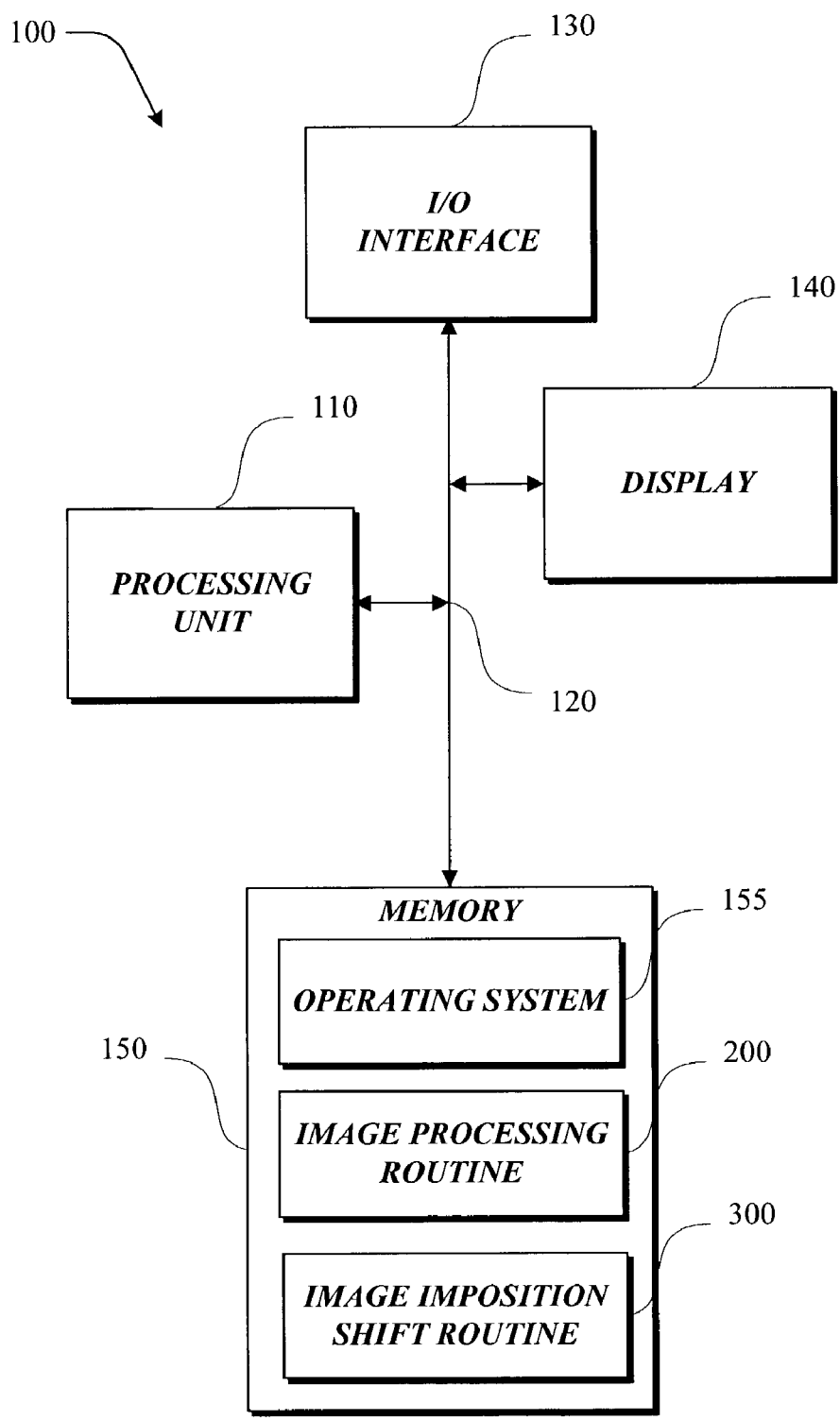
FIG. 1 is a block diagram of an exemplary computing device suitable for executing an image processing routine formed in accordance with the present invention.

FIG. 1 depicts several of the key components of a computing device 100 suitable for implementing the present invention. Those of ordinary skill in the art will appreciate that the computing device 100 may include many more components than those shown in FIG. 1. However, it is not necessary that all of these generally conventional components be shown in order to disclose an enabling embodiment for practicing the present invention. As shown in FIG. 1, the computing device 100 includes input/output ("I/O") interface 130 for connecting to other devices (not shown). Those of ordinary skill in the art will appreciate that the I/O interface 130 includes the necessary circuitry for such a connection, and is also constructed for use with the necessary protocols.

The computing device 100 also includes a processing unit 110, a display 140, and a memory 150 all interconnected along with the I/O interface 130 via a bus 120. The memory 150 generally comprises a random access memory ("RAM"), a read-only memory ("ROM"), and a permanent mass storage device, such as a disk drive. The memory 150 stores an operating system 155, an image processing routine 200, and an image imposition shift routine 300. As those skilled in the art and others will readily appreciate, the illustrated software components may be loaded from a computer-readable medium into the memory 150 of the computing device 100 using a drive mechanism (not shown) associated with the computer readable medium, such as a floppy, tape, or DVD/CD drive or via the I/O interface 130.

Although an exemplary computing device 100 has been described that generally conforms to a conventional general purpose computing device, those of ordinary skill in the art will appreciate that a computing device 100 may be any of a great number of devices capable of processing digital images including, but not limited to, printing servers configured for digital image processing.

Figure 2:
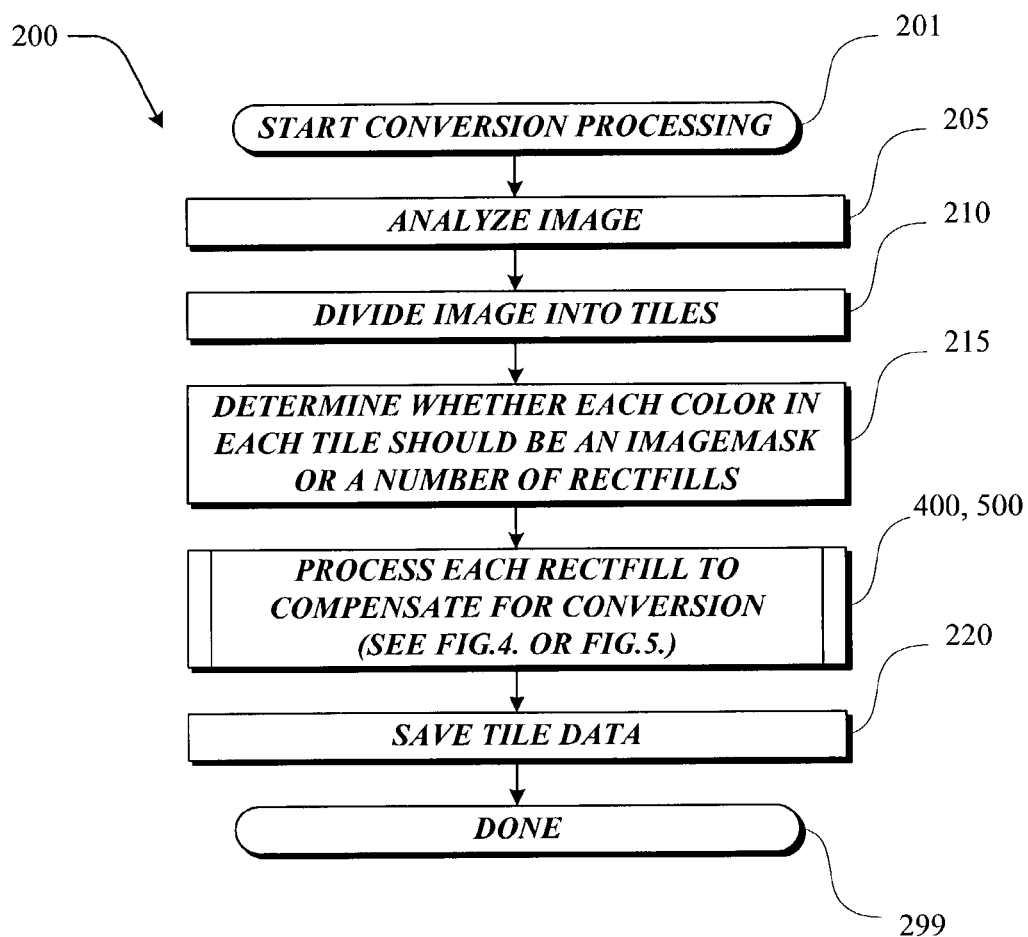
FIG. 2 is a flow diagram of an image processing routine formed in accordance with the present invention.

The computing system 100 illustrated in FIG. 1, is used to process digital images. One aspect of digital image processing is converting raster images into images that are processed more efficiently in a raster image processor (RIP). FIG. 2 is a flow chart illustrating an exemplary image conversion processing routine 200 formed in accordance with the present invention and implementable by the computing system 100.

Figure 4:
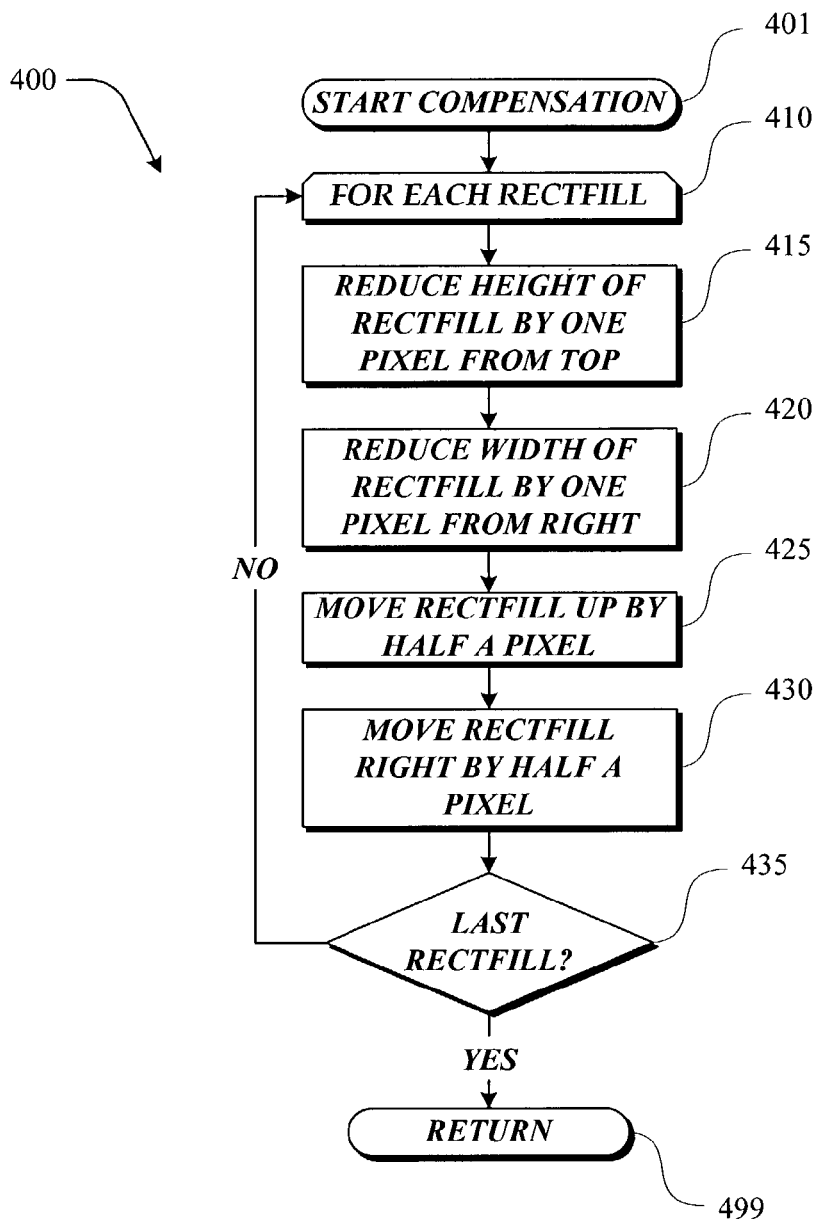
FIG. 4 is a flow diagram of an image compensation subroutine suitable for use in FIGS. 2 and 3.
Figure 5:
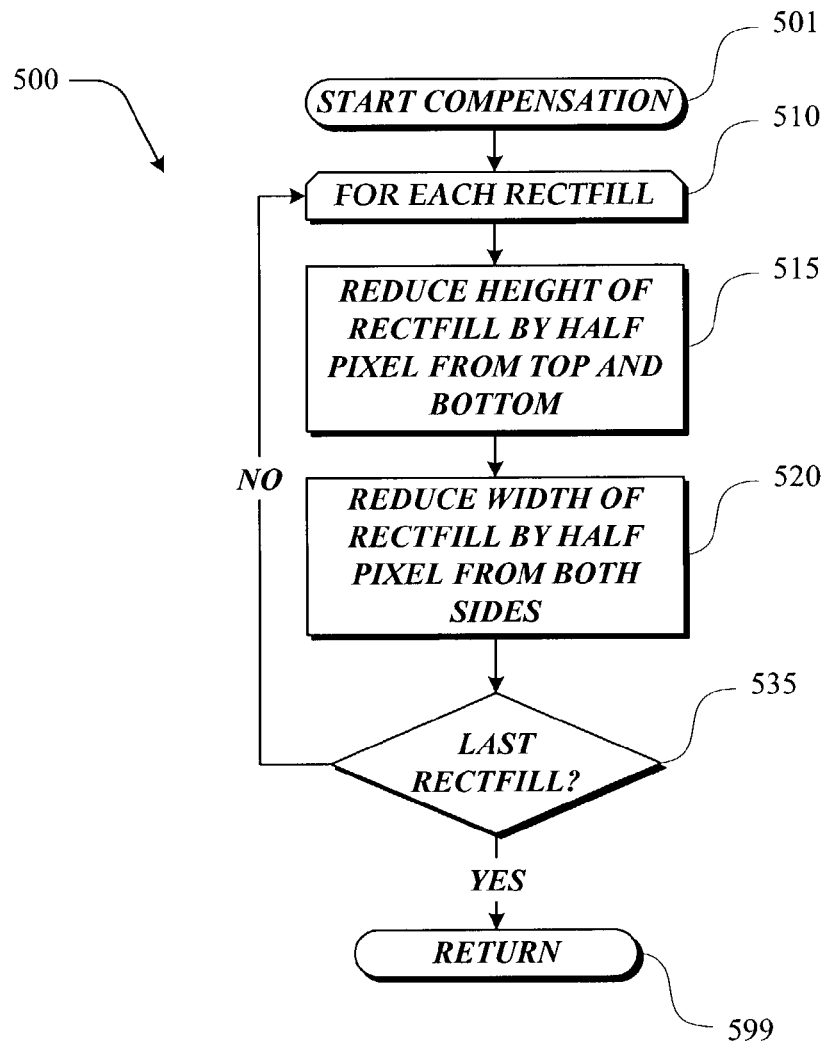
FIG. 5 is a flow diagram of an alternate image compensation subroutine suitable for use in FIGS. 2 and 3.

The image conversion processing routine 200 illustrated in FIG. 2 begins in block 201, and proceeds to block 205 where the raster image being converted is analyzed to locate the LW portions (possibly including CT portions consisting of a single color) of the image. Next, in block 210, the LW image is divided into tiles. The image tiles may be of uniform size or may be of variable size such that they optimize either or both the speed and size of a resulting stored image. However, in many instances, it may be more efficient to uniformly size the tiles. Next, in block 215, a determination (which does not form part of this invention) is made for each LW color in each tile whether the color should be represented as an imagemask or as one or more rectfills. After a determination is made how best to represent the LW colors, then in subroutine block 400 or 500 the rectfills are processed to compensate for possible errors that occur as a result of the conversion to a reduced data volume image using rectfills. A suitable rectfill compensation subroutine 400 or 500 formed in accordance with this invention is illustrated in FIG. 4 or FIG. 5, respectively, and described below. After the rectfill compensation subroutine 400 or 500 ends, the resulting tile data is saved at block 220. Routine 200 then ends at block 299.

Figure 3:
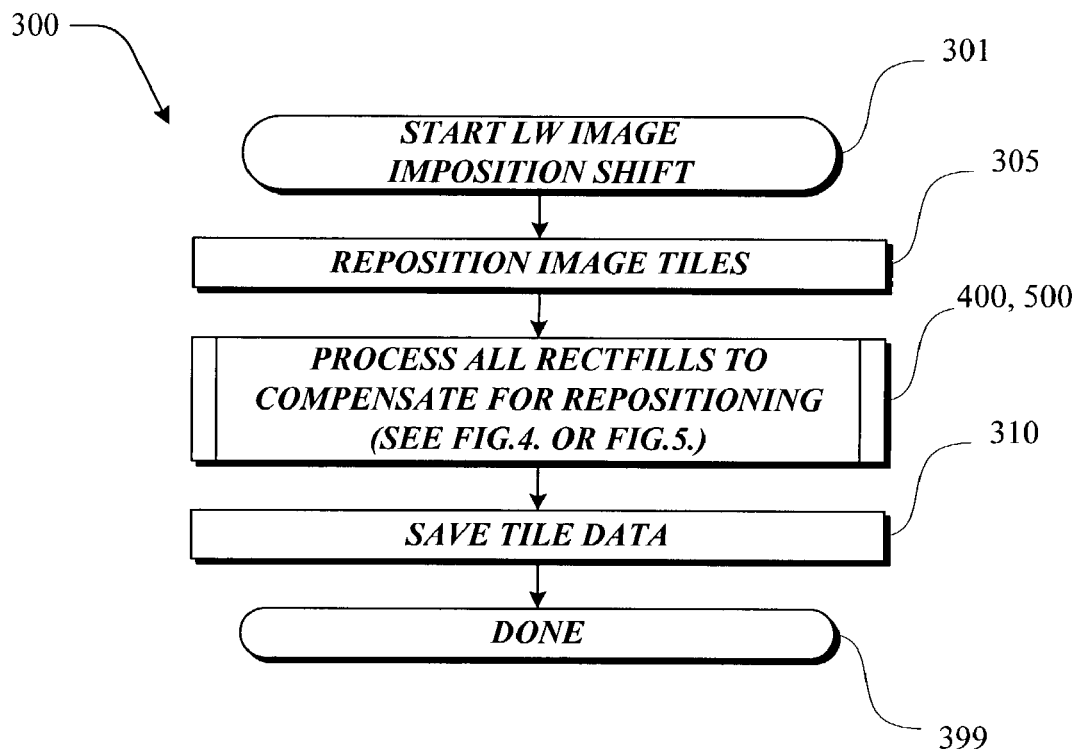
FIG. 3 is a flow diagram of an image moving routine formed in accordance with the present invention.

Rectfill compensation is not only useful during the conversion of image data to a reduced size, but also when uncompensated LW data is shifted within an image, or in some way rectfills become misaligned with pixel locations. Misalignment often occurs because different rendering devices have different "grids" for rendering an image, thereby causing coordinates to become out of alignment. As a result, LW data represented as rectfills may accidentally fill some adjacent pixels. FIG. 3 illustrates an exemplary image compensation shift routine 300 suitable for eliminating such shift errors.

Routine 300 begins at block 301 and proceeds to block 305, where image tiles are repositioned according to the new location for a shifted image. Next, in the rectfill compensation subroutine such as the rectfill compensation subroutine 400 or 500 shown in FIG. 4 or FIG. 5, respectively, and described below, all rectfills are compensated for after image repositioning. After the rectfill compensation subroutine 400 or 500 ends, then in block 310 the tile data is saved and routine 300 ends at block 399.

As those skilled in the art and others will appreciate there are many reasons for shifting LW information in an image. For example, if a change in resolution is desired, the LW data represented by rectfills may fill pixels having entirely different coordinates, as either more or less pixels are being filled by each rectfill. Accordingly, a change in image resolution can create an image shift that is compensatable using the present invention.

FIG. 4 illustrates an image compensation subroutine formed in accordance with the invention suitable for use in the routines illustrated in FIGS. 2 and 3. That is, the image compensation subroutine shown in FIG. 4 is suitable for compensating for either shifting of tile locations (FIG. 3) and/or conversion of images employing filed (FIG. 2).

The image compensation subroutine 400 shown in FIG. 4 begins at block 401 and proceeds to block 410, which starts a loop where, for each rectfill, the rectfill is first reduced in size and, then, recentered with respect to its previous position. Accordingly, in block 415, the height of the rectfill is reduced by one pixel from the top. Then, in block 420, the width of the rectfill is reduced by one pixel from the right. Processing continues to block 425 where the rectfill is moved up by half a pixel. Next, in block 430, the rectfill is moved right by half a pixel. In effect, blocks 425 and 430 shift the rectfill along a vector to recenter the rectfill. Then in decision block 435 a determination is made whether this was the last rectfill. If not, processing loops back to 410, and the foregoing steps are repeated. If, however, in decision block 435 it was determined that this was the last rectfill, then subroutine 400 ends at block 499 and processing returns to the calling routine. As those skilled in the art and others will appreciate, the reduction of rectfills by one pixel from the top and one from the right should be construed as exemplary, not limiting. Rectfills could be reduced by one pixel from the bottom and one from the left and the resulting smaller rectfill repositioned down and to the left, for example.

Those skilled in the art and will also appreciate that there are other ways of describing reducing the size of a rectfill. For example, in alternate image compensating subroutine 500 shown in FIG. 5, the height of the rectfill is reduced by half a pixel from the top and half a pixel from the bottom, and the width of the rectfill is reduced by half a pixel from the left and half a pixel from the right. Alternatively, the height and width is reduced by either more or less than one half a pixel on all sides. Image compensation subroutine 500 begins in block 501 and proceeds to looping block 510, where for each rectfill the rectfill is reduced in size on all sides. Accordingly, in block 515, the height of the rectfill is reduced by half a pixel from the top and the bottom. Then, in block 520, the width of the rectfill is reduced by half a pixel from both sides (i.e., the right and left sides). Processing continues to decision block 535 where a determination is made whether this was the last rectfill. If not, processing loops back to block 410, and the foregoing steps are repeated. If, however, in decision block 535 it was determined that this was the last rectfill, subroutine 500 ends at block 599 and processing returns to the calling routine. As those skilled in the art and others will appreciate, the reduction of rectfills by half a pixel from the top and bottom and half a pixel from the right and left sides should be construed as exemplary, not limiting. Rectfills could be reduced by more or less than half a pixel on all sides, for example.

Figure 6A:
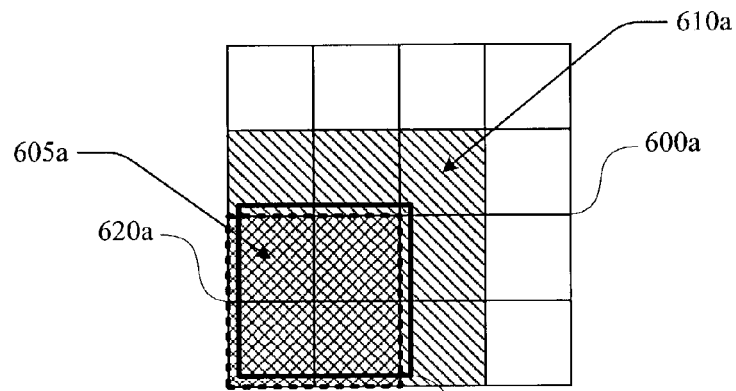
FIG. 6A is an example of the orientation of tile pixels and an uncompensated rectfill.
Figure 6B:
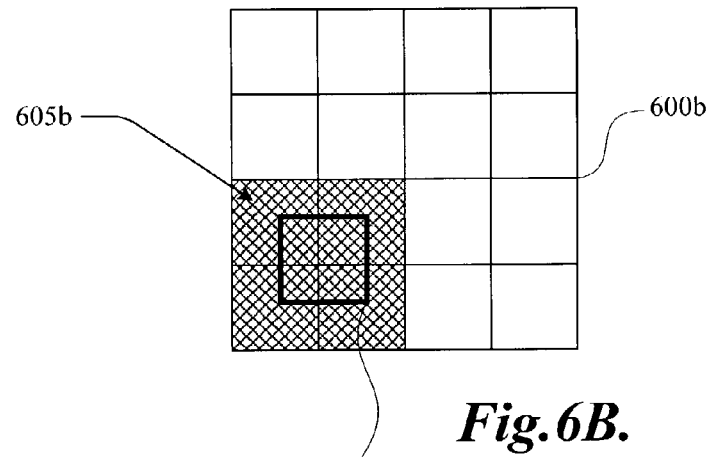
FIG. 6B is an example, similar to FIG. 6A, of the orientation of tile pixels and a compensated rectfill.
Figure 6C:
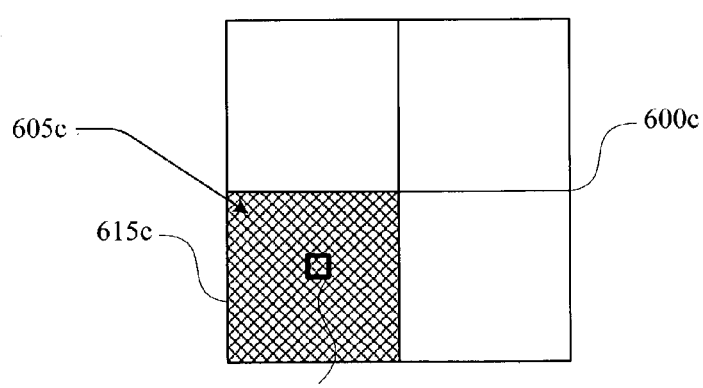
FIG. 6C is another example of the orientation of tile pixels having a lower resolution than FIGS. 6A and 6B and a compensated rectfill.

As those skilled in the art and others will better appreciate from viewing FIGS. 6A, 6B and 6C and the following description, while one half of a pixel reduction on all sides is a good estimate to use, up to, but not including, a whole pixel reduction on all sides would still allow the present invention to operate effectively. A total width and height reduction of less than two pixels is the limiting factor. In general, any size reduction is effective so long as the rectfill boundary intersects at least a portion of only those pixels it is intended to fill.

One of ordinary skill in the art will appreciate that the rectfill compensation methods of the present invention may be used in image manipulations other than those described herein (conversion and image shifting). In general, any image manipulation that could result in rectfills filling pixels outside the desired pixel area may benefit from the rectfill compensation methods of the present invention.

FIGS. 6A-6C illustrate, in a simplified form, the operation of the compensation subroutine 400 or 500 when compensating for unintending filling of pixels with a rectfill. FIG. 6A illustrates a rectangular tile 600a four pixels wide and four pixels high. FIG. 6A also illustrates a rectfill 605a that is intended to control the filling of the four pixels located in the lower left hand corner of the tile 600a. Because the rectfill is misaligned with the pixels it is to fill, pixels 610a it was not intended to fill are filled. This unintended result occurs because the border 650a of the rectfill 605a overlies a small portion of a region that should not be filled, namely the six pixels 610a adjacent to the four pixels to be filled. Ideally a rectfill boundary only intersect the desired pixels, in this case the four pixels in the lower left hand corner of the tile 610a, as is shown by dotted boundary 620a. How-ever, such coverage is not always possible. As those of ordinary skill in the art will appreciate, a rectfill border that intersects even a tiny portion of a pixel will still cause that pixel to be filled as part of a rectfill. The compensation method of the present invention is directed to avoiding this undesirable result. More specifically, applying compensation subroutine 400 or 500 to the rectfill 605a in FIG. 6A creates a rectfill 605b of the size shown in FIG. 6B. Additionally, FIG. 6B shows a four by four pixel tile 600b similar to the tile 600a shown in FIG. 6A. In FIG. 6B, the border 650b of the rectfill 605b has been reduced by half a pixel on all sides. As a result, only the four pixels located in the lower left hand corner of the tile 600b are intersected by the rectfill 605b. Hence, no unintended pixels are intersected by the border 650b of (compensated) rectfill 605b.

The rectfill compensation method of the invention becomes particularly valuable when the resolution of an image is reduced. As noted above, FIG. 6A shows a 4×4 pixel tile wherein a rectfill 605a is intended to intersect only the four pixels located in the lower left hand corner of the tile. FIG. 6C illustrates a two pixel by two pixel tile 600c wherein a single pixel 615c located in the lower left hand corner is shown aligned with a rectfill 605c. That is, the border 650c of the rectfill 605c only intersects the lower left hand corner pixel 615c. FIGS. 6A and 6C show that if the resolution of a 16-pixel tile (FIG. 6A) is reduced to a 4-pixel tile (FIG. 6C), the lower resolution tile 600c would be completely filled unless the border of the rectfill is reduced.

For ease of illustration, FIGS. 6A-6C illustrate a two pixel by two pixel rectfill. The principles depicted, however, are equally applicable to much larger rectfills.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for image compensation, the method comprising:
   dividing the image into a plurality of independent tiles;
   producing a vector representation of a tile including a vector rectfill element corresponding to a plurality of adjacent image pixels arranged in a rectangular formation within the tile;
   reducing the height of said vector rectfill element by an amount up to, but not more than the size of two pixels;
   reducing the width of said vector rectfill element by an amount up to, but not more than the size of two pixels; and
   saving said vector rectfill element.

2. The method of claim 1 wherein said height adjustment is substantially the size of one pixel.

3. The method of claim 1 wherein said width adjustment is substantially the size of one pixel.

4. The method of claim 1 further comprising shifting said rectfill horizontally and shifting said rectfill vertically so as to maintain said rectfill centered.

5. The method of claim 4 wherein said rectfill is shifted by an amount up to, but not including, the size of a pixel in said horizontal and vertical directions.

6. The method of claim 1 wherein said rectfill is moved along a vector directed at or between either of said first and second directions, said vector having a displacement of less than one and one-half pixels.

* * * * *